United States Patent Office 2,707,721
Patented May 3, 1955

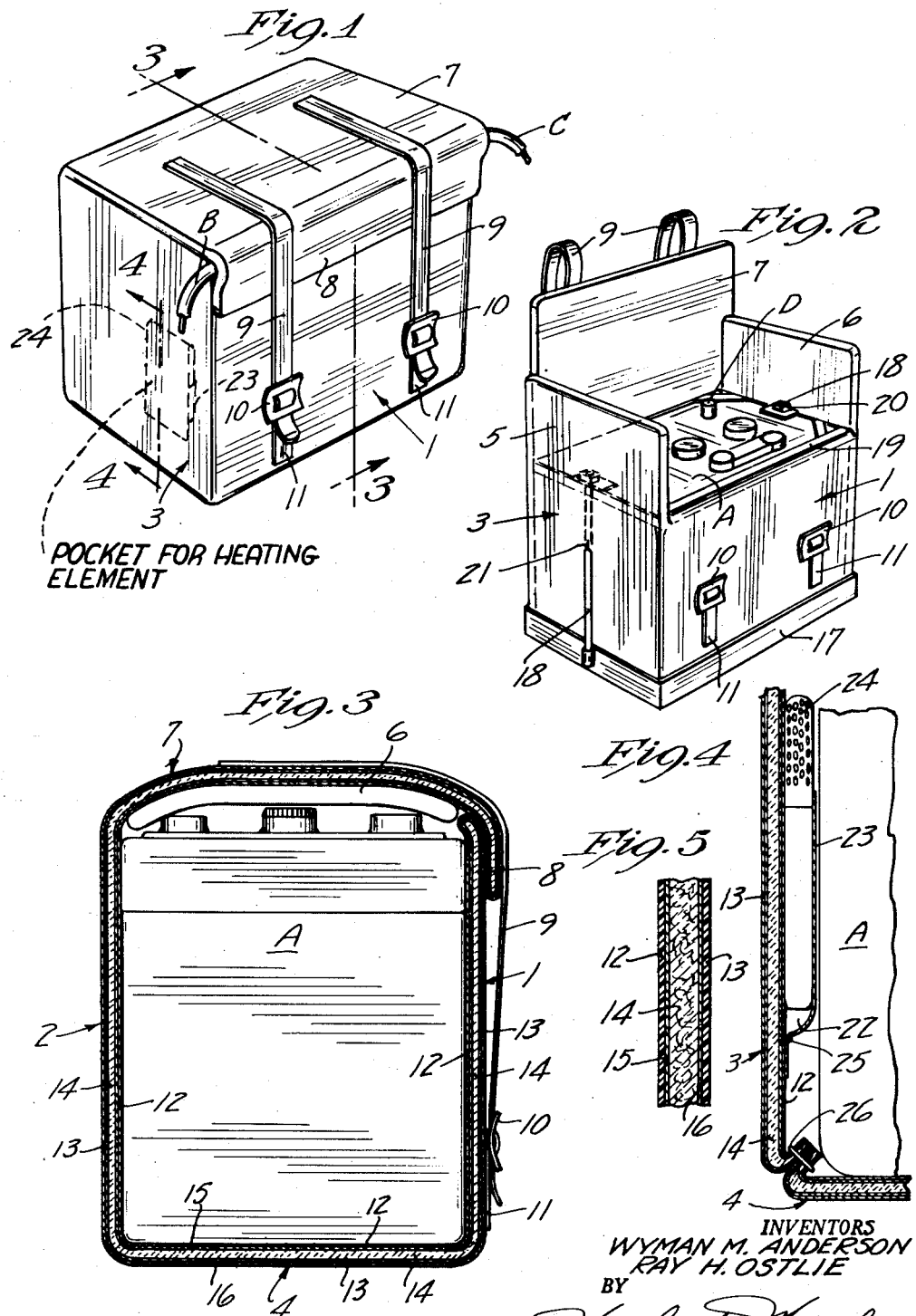

2,707,721

HEAT INSULATING JACKET FOR STORAGE BATTERIES

Wyman M. Anderson and Ray H. Ostlie,
Minneapolis, Minn.

Application November 6, 1953, Serial No. 390,476

7 Claims. (Cl. 136—166)

Our invention relates generally to containers and more specifically to containers for storage batteries utilized as a source of electrical current in automotive vehicles and the like.

It is well known to those familiar with storage batteries that, when the temperature of the battery is lowered appreciably such as occurs when a vehicle is left idle in an unheated garage or out-of-doors in winter weather, the efficiency of the battery is materially reduced, often to a point where difficulty is experienced in starting the vehicle engine. This difficulty is heightened by the stiffening of lubricant in the engine due to low temperatures. It has been determined that at a temperature of 0° F. the efficiency of a storage battery is reduced to 45% of that present at a temperature of 80° F.

It is further known that a certain amount of heat is generated within a storage battery during the charging thereof. It is therefore an important object of our invention to provide novel means for maintaining the battery in a relatively warm condition during prolonged periods of idleness in cold weather. To this end we provide a jacket or container which totally encloses the battery and which is provided with heat insulation and reflecting means whereby some of the heat radiated from the battery during the charging thereof is reflected back to the same.

Another object of our invention is the provision of a battery container jacket as set forth which is impervious to the acid electrolyte of the battery and which is likewise impervious to oils and greases which may come in contact therewith.

Another object of our invention is the provision of a battery container jacket as set forth which may be applied to the battery and totally enclose the same without necessitating alterations in the usual battery mounting means.

Another object of our invention is the provision of a battery container jacket of the above type which effectively protects the battery from excessive heat radiating from the engine of a vehicle when the battery is mounted within the engine compartment thereof.

Another object of our invention is the provision of a battery container jacket as set forth having means therein for supporting an auxiliary heating element.

Still another object of our invention is the provision of a battery container jacket which may be readily opened to permit testing and servicing of the battery, and which when closed, will permit gases to escape from the battery.

The above and still further highly important objects and advantages of our invention will become apparent from the following detailed specification, appended claims and attached drawings.

Referring to the drawings, which illustrate the invention, and in which like characters indicate like parts throughout the several views:

Fig. 1 is a view in perspective of our novel battery container jacket shown in a closed position;

Fig. 2 is a view in perspective of our novel battery container jacket in an open position and mounted in a conventional battery support;

Fig. 3 is an enlarged transverse section taken substantially on the line 3—3 of Fig. 1, a battery within the container jacket being shown in end elevation;

Fig. 4 is an enlarged fragmentary section taken substantially on the line 4—4 of Fig. 1; and Fig. 5 is a still further enlarged fragmentary detail in section showing the wall construction of our novel container jacket.

In the preferred embodiment of the invention illustrated, a battery jacket or container made in accordance with our invention is shown as being generally rectangular in form and as comprising opposed side walls 1 and 2, end walls 3, one of which is shown, and a bottom wall 4. The container jacket is open-topped and is adapted to receive therein a conventional storage battery A. Integrally formed with the end walls 3 are upturned extended end flaps 5 and 6 which are foldable inwardly over the top of the battery A. A closure flap 7 is integrally formed with the rear wall 2 and is foldable into overlying relationship to the downturned end flaps 5 and 6. The closure flap 7 is of a length to extend downwardly over the upper end portion of the front wall 1 as indicated at 8, see Figs. 1 and 3. Means for releasably locking or anchoring the closure flap 7 in its closure-forming position of Figs. 1 and 3 comprises a pair of laterally spaced straps 9 that are sewn or otherwise rigidly secured at their upper ends to the closure flap 7, and cooperating buckles or the like 10 which are anchored to the lower portion of the front wall 1 by means of anchoring straps or the like 11. The free ends of the straps 9 are receivable one each in each of the buckles 10 in the usual manner. Preferably, the buckles 10 as well as the straps 9 and 11 are made from fabrics or synthetic resins which are impervious to sulphuric acid which comprises the electrolyte for the battery A.

For the purpose of insulating the battery A from extreme cold temperatures, and to make the container jacket resistant or impervious to the action of acid electrolyte thereon, the jacket is preferably made from a multiplicity of plies of material stitched or otherwise secured together. In the preferred embodiment of the invention illustrated, the several walls and flaps comprising the container jacket include inner and outer coverings 12 and 13 respectively and an intermediate layer of porous heat insulating material 14. The inner and outer coverings are made from similar material, the same being synthetic resin in flexible sheet form, said material like that of the straps 9 being impervious to acid, greases and oils. The relatively thick intervening layer 14 is preferably in the nature of a felted mass made from flexible glass filaments or the like, commonly known as glass wool or "Fiber Glass." This material has been found to have relatively high heat insulating qualities, and is, like the inside and outside coverings 12 and 13, impervious to the action of the acid electrolyte.

Interposed between opposite sides of the insulating layer 14 and the adjacent surface of the inside and outside coverings 12 and 13 respectively are heat reflective layers in the nature of sheets of metal foil such as aluminum or the like. With reference to Figs. 3–5 it will be seen that the foil layer adjacent the inner covering 12 is indicated at 15 whereas the outer reflective layer adjacent the outside covering 13 is indicated at 16. While we have shown a pair of spaced heat reflective layers, it should be understood that for particular applications, or for use in different climatic conditions, one or the other of said layers 15 and 16 may be eliminated. For instance, in cold climates during seasons of low outdoor temperature, the inner reflective layer 15 reflects heat radiated from the battery backwardly to the same. This heat is usually not excessive being the result of normal charging of the battery by a generator not shown. The inner reflective layer 15 prevents dissipation of this heat and helps to maintain the battery A in a warm condition during prolonged periods of idleness during cold weather. The outer heat reflective layer 16 is particularly advantageous where batteries are mounted in the engine compartment of the automotive vehicle. In this case, particularly during extremely warm weather, the battery is subject to heat radiated from the engine particularly under prolonged use thereof. The outer reflective layer 16 is very effective in radiating the engine heat away from the battery, thus protecting the same against over-heating and consequent possible buckling of the battery plates.

With reference to Fig. 1 it will be seen that our novel container jacket construction does not interfere with the passage of battery cables indicated at B and C from the terminals D of the battery A to their connections with the electrical system of the vehicle. The cables B and C are attached to the terminals D, one of which is shown, by conventional connector clamps not shown. As shown in Fig. 2, our novel container jacket is placed in the usual battery supporting frame 17 which has upstanding holddown rods or bolts 18 connected to a clamping frame or the like 19 by means of clamping nuts or the like 20. With this type of mounting means, it is but necessary for the user to cut a relatively small slit 21 through the end walls 3 and insert the hold-down bolts 18 therethrough so that the frame 19 may engage the top of the battery A within the container. The supporting frame 17, hold-down bolts 18 and frame 19 form no part of the instant invention and are shown merely for the purpose of illustrating the ease with which our novel container jacket may be applied without disturbing or altering the battery support within a vehicle.

Although our novel battery container jacket maintains the battery A in a relatively warm condition for an appreciable length of time in cold weather, occasions arise when a vehicle is left idle for extreme periods of time. Obviously under these conditions, the battery A will gradually cool to the ambient temperature of the vehicle. For the purpose of introducing a heating medium to the interior of the container jacket, so that the battery may be preheated to a point where the normal efficiency thereof may be restored, we provide an upwardly opening pocket or the like 22 secured to the inner surface of one of the end walls 3. The pocket 22 is defined by a portion of the inside covering 12 of the end wall 3 and a sheet 23 of synthetic resin identical to that of the inner and outer coverings 12 and 13. A conventional heating element 24 may be inserted into the pocket 22 and left in place for a length of time sufficient to bring the battery to normal operating temperature. The heater 24 is diagrammatically shown and may be any one of a number of types in common use such as electrically operated resistance-type, or that in which heat is generated by liquid or gaseous fuels. As shown in Fig. 4, the pocket-forming sheet or flap 23 is secured to the adjacent wall 3 by stitching or the like 25, and the several wall portions of the container are stitched together as indicated at 26 in Fig. 4. Preferably, thread made from spun glass fibers or other material impervious to acid electrolyte is utilized for stitching the various components of our novel container together.

While we prefer to stitch the various component parts of our novel battery jacket together, it will be appreciated that these components may be secured together by any suitable means such as any one of well known adhesives or by welding or heat sealing. The materials used in our novel container jacket are such that the containers are incapable of supporting combustion. A flame directed against the container will cause the same to char or melt, or even flame to some extent, however, upon removal of the flame directed thereagainst, the flame of the container itself will be immediately extinguished. It should also be borne in mind that, although the closure member 7 may be tightened to a reasonable degree by the straps 9 and buckles 10, gases formed in the battery and emanating through the vents thereof will escape from the interior of the container adjacent the cables B and C, so that there is no danger of a gas build-up within the battery or the container jacket.

Our invention has been thoroughly tested and found to be completely satisfactory for the accomplishment of the objectives set forth; and while we have shown and described a preferred embodiment of our novel battery jacket, it will be understood that the same is capable of modification without departure from the spirit and scope of the invention as defined in the claims.

What we claim is:

1. A storage battery jacket comprising a generally rectangular container having pairs of opposed side walls and a bottom wall and being open at its top, closure means for the open top of said container, said closure means including flap elements integrally formed with opposite side walls of one of said pairs thereof and foldable toward each other over the top of a storage battery when the same is placed in the container, and a closure flap integrally formed with one of the side walls of the other of said pairs thereof and foldable into overlying relationship to said flap elements to provide a double thickness of container material at the top of said container, said closure flap being of a length to extend downwardly over a portion of the other side wall of said other pair, and means on said closure flap and said last-mentioned side wall for releasably locking said closure flap in its container closed position, said container walls and flaps comprising inside and outside coverings of electrically nonconductive flexible sheet material which is impervious to acid and grease, an intermediate layer of porous flexible heat insulating material, and a flexible sheet of heat reflective material interposed between said layer of insulating material and one of said coverings.

2. A storage battery jacket comprising a generally rectangular open-topped container having opposed side walls, opposed end walls, a bottom wall, closure means for the open top of said container, said closure means including end flap elements integrally formed with the end walls of said container and foldable over the top of a storage battery when the same is placed in the container, and a closure flap integrally formed with one of the side walls and foldable into overlying relationship to said end flap elements to provide a double thickness of container material at the top of said container, said closure flap being of a length to extend downwardly over a portion of the other of said side walls, and means on said closure flap and said other side wall for releasably locking said closure flap in its container closed position, said container walls and flaps comprising inside and outside coverings of electrically nonconductive flexible sheet material which is impervious to acid and grease, an intermediate layer of porous flexible heat insulating material, and a flexible sheet of heat reflective material interposed between said layer of insulating material and one of said coverings.

3. The structure defined in claim 2 in which said sheet of heat reflective material is interposed between said layer of porous insulating material and said inside covering.

4. A storage battery jacket comprising a generally rectangular open-topped container having opposed side walls, opposed end walls, a bottom wall, closure means for the open top of said container, said closure means including end flap elements integrally formed with the end walls of said container and foldable over the top of a storage battery when the same is placed in the container, and a closure flap integrally formed with one of the side walls and foldable into overlying relationship to said end flap elements to provide a double thickness of container material at the top of said container, said closure flap being of a length to extend downwardly over a portion of the other of said side walls, and means on said closure flap and said other side wall for releasably locking said closure flap in its container closed position, said container walls and flaps comprising inside and outside coverings of electrically nonconductive flexible sheet material which is impervious to acid and grease, an intermediate layer of porous flexible heat insulating material, and a pair of flexible sheets of heat reflective material one interposed between one side of said insulating material and said inside covering and the other interposed between the opposite side of said layer of insulating material and said outside covering.

5. The structure defined in claim 1 in further combination with means on said inside covering cooperating therewith to define an upwardly opening pocket within said container for the reception of a heater element for the interior of the container and the battery therein.

6. The structure defined in claim 1 in which said means for releasably locking the closure flap in its container closed position comprises a pair of laterally spaced straps connected to said closure and a pair of spaced strap-receiving buckles secured to said last-mentioned side wall of the container.

7. A storage battery jacket comprising a generally rectangular open topped container having opposed side walls, opposed end walls, a bottom wall, closure means for the open top of said container, said closure means including end flap elements integrally formed with the end walls of said container and foldable over the top of a storage battery when the same is placed in the container, and a closure flap integrally formed with one of the side walls and foldable into overlying relationship to said end flap elements to provide a double thickness of container material at the top of said container, said closure flap being of a length to extend downwardly over a portion of the other of said side walls, and means on said closure flap and said other side wall for releasably locking said closure flap in its container closed position, said container walls and flaps comprising inside and outside coverings of electrically nonconducting synthetic resin in flexible sheet form, said coverings being moistureproof and impervious to acid and grease, an intermediate layer of glass wool, and a sheet of aluminum foil interposed between said layer of fiber glass and the inner one of said coverings.

References Cited in the file of this patent
UNITED STATES PATENTS

| | | |
|---|---|---|
| 1,445,538 | Mount et al. | Feb. 13, 1923 |
| 1,522,479 | Aldrich | Jan. 13, 1925 |